July 18, 1933. E. L. WILLSON ET AL 1,918,730
PLOW
Filed Aug. 31, 1931    4 Sheets-Sheet 1
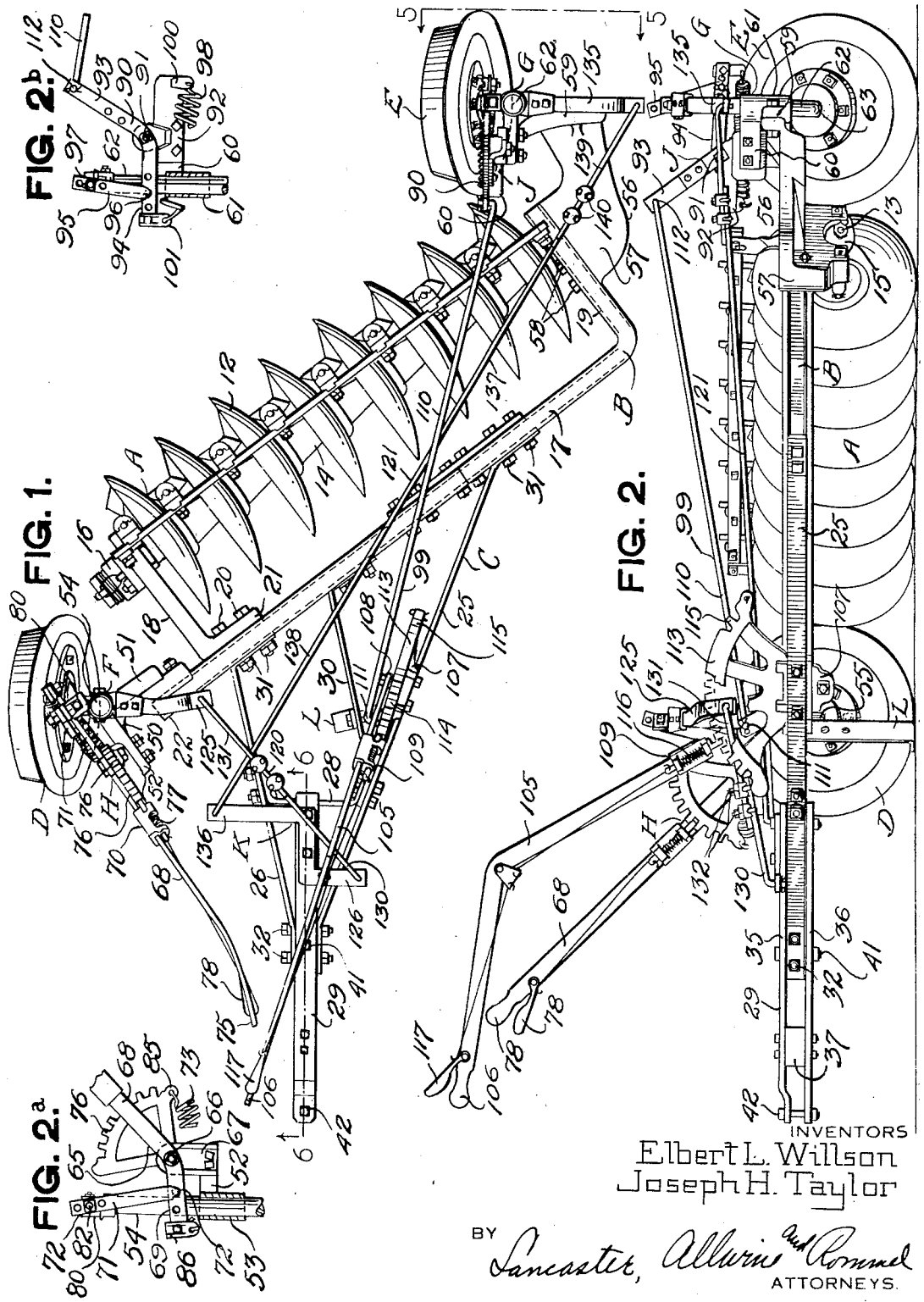
INVENTORS
Elbert L. Willson
Joseph H. Taylor
BY Lancaster, Allwine and Rommel
ATTORNEYS.

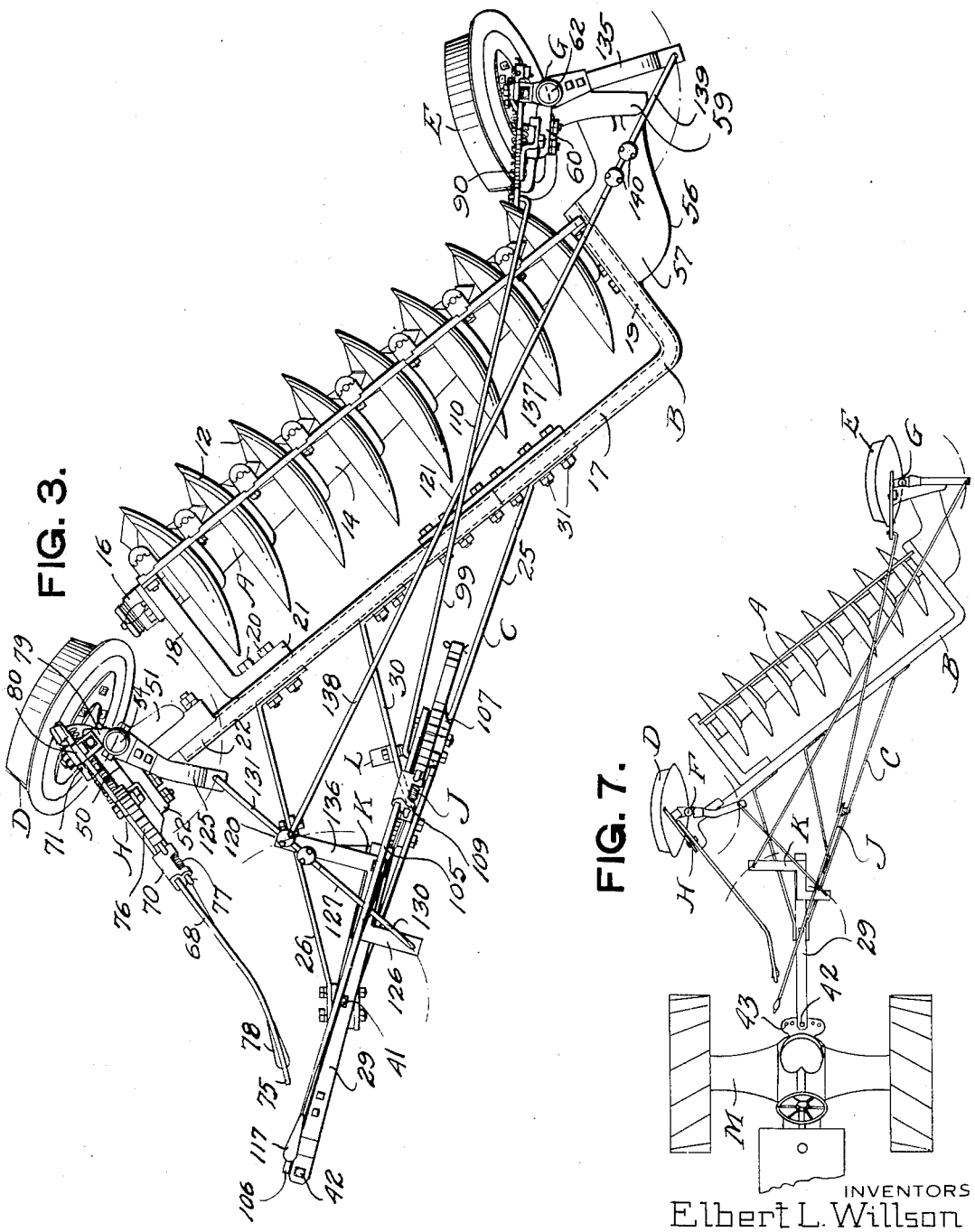

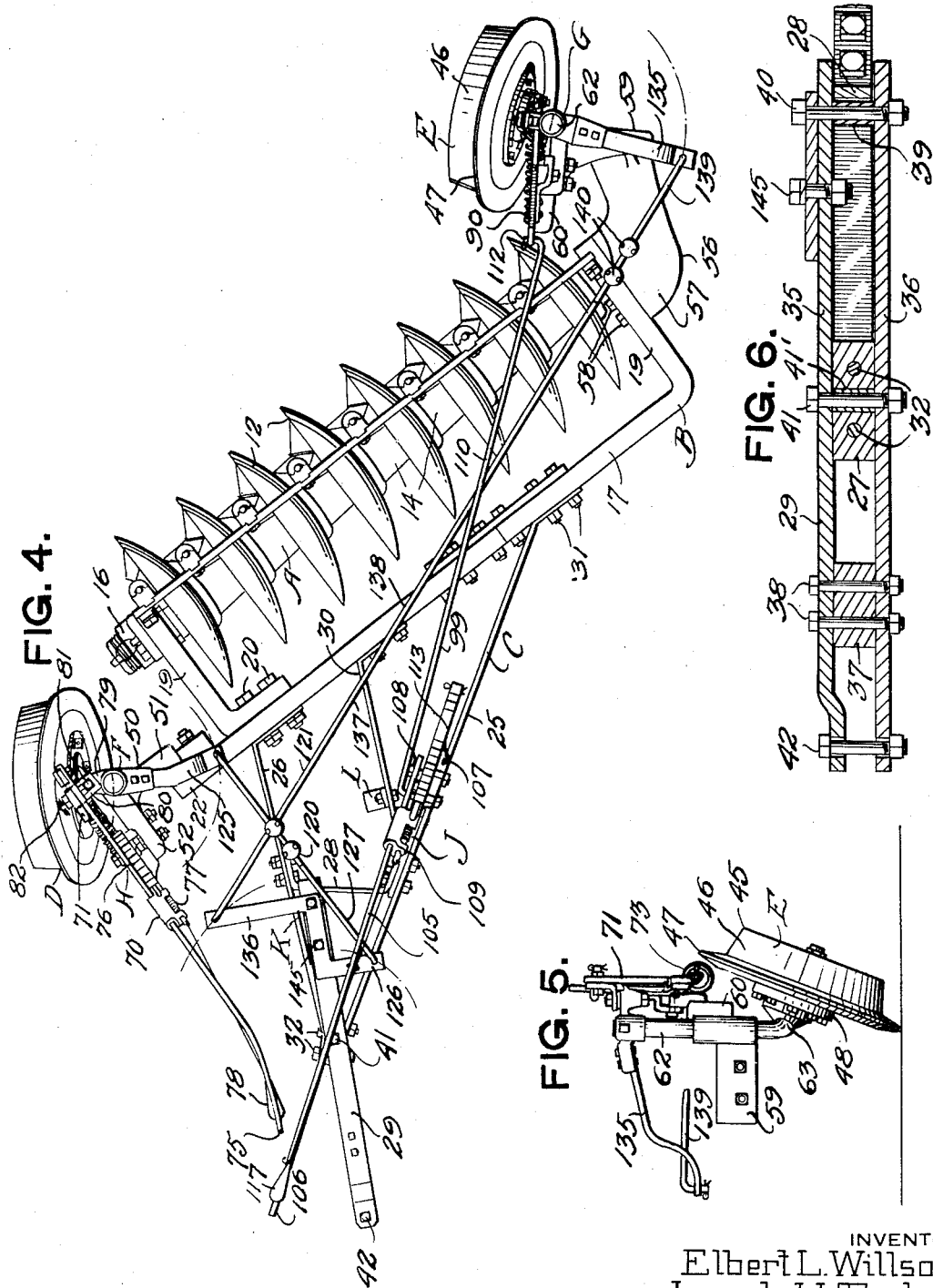

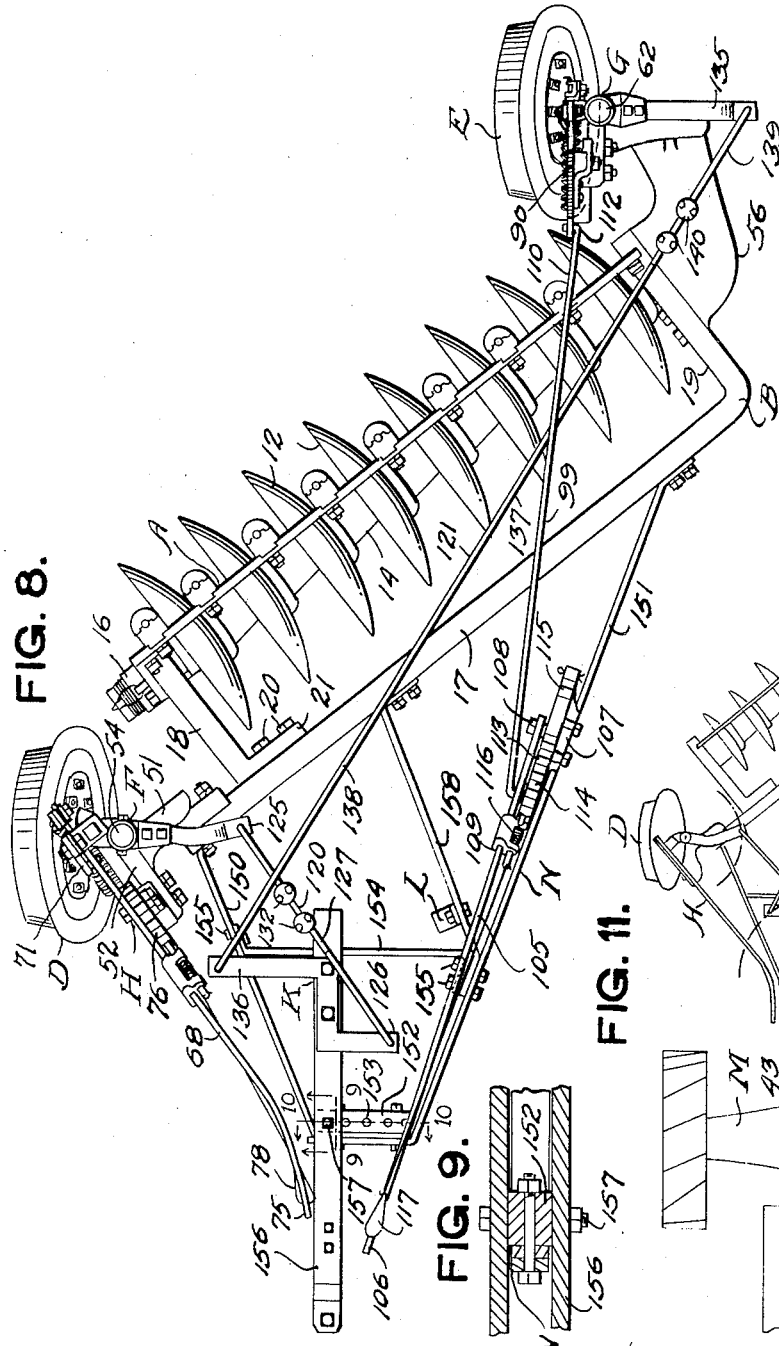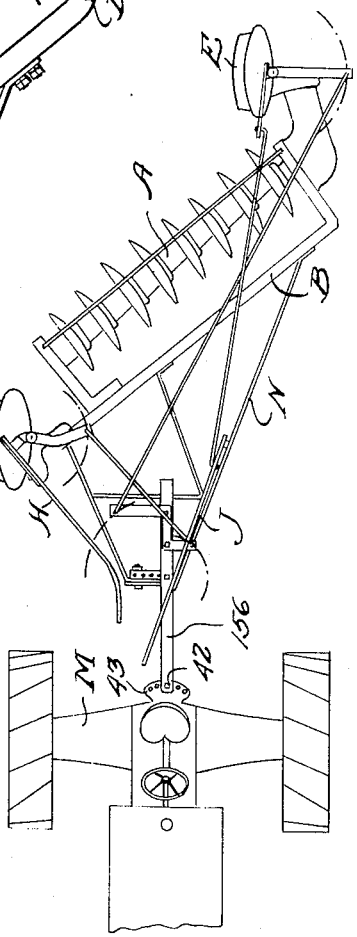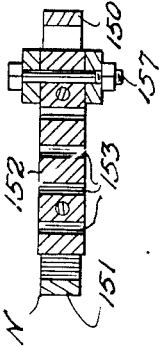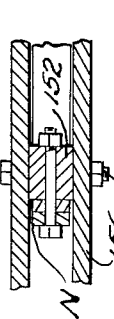

Patented July 18, 1933

1,918,730

UNITED STATES PATENT OFFICE

ELBERT L. WILLSON AND JOSEPH H. TAYLOR, OF ATHENS, TENNESSEE

PLOW

Application filed August 31, 1931. Serial No. 560,452.

The present invention relates to plows, and while particularly well adapted for use in working wheat land, they are by no means limited to such use. The plow is preferably of the type where a plurality of discs are rotatable about a common axis extending diagonally crosswise the path of travel of the plow.

The principal objects of the invention are, to provide a plow which is efficient in operation and easy to guide, especially when trailing behind a tractor while turns are being made, at the ends of fields, and when backing the plow, by use of the tractor, to a particular location, as into a shed; and which will uniformly plow the soil even tho the previous crop was of such a character, as corn or cotton, where there are humps or ridges encountered in the field when plowing.

Another object of the invention is to provide a plow of the character described which makes unnecessary a land side or third wheel, the two ground wheels traveling in furrows. By the construction of the plow according to the present invention, the expense and weight of the land side wheel is done away with, turning to the right or left is facilitated in that the turn may be comparatively sharp and with less load on the tractor or other draft means than where the plow carries a land side wheel, in advance of the plow, and the plow is not materially influenced by humps or ridges in the field, since there is no land side wheel to ride over them.

Another object of the invention is to provide a plow having two furrow wheels which are simultaneously controlled in their movement, in a positive manner, by the hitch or draft bar of the plow, (in contradistinction to caster wheels or those which are manually controlled by the use of links and levers) so that the plow will trail a tractor without material lateral skidding and which may be backed in a positive manner and not merely take the path of least resistance, regardless of where it may lead to.

A further object of the invention is to provide means for adjusting the relative position of the plow frame with respect to the upright shafts of the furrow wheel mountings and which means includes levers within easy reach of the driver of the tractor, so that adjustment of either wheel and adjacent frame portion may be had without materially effecting the relation of the other wheel and its adjacent frame portion.

A still further object of the invention is to provide, as a unit, a flanged furrow wheel and a mounting therefor, for the support of the plow frame, which unit may be used interchangeably at the front or rear of the plow frame, and which mounting includes an upright shaft and a laterally extending stub axle at an obtuse angle to the axis of the shaft, with the wheel so mounted on the stub axle that the lowermost portion of its flange is in the axis of the upright shaft, thus reducing to a minimum the force required to turn the upright shaft, and hence change the position of the wheel from one plane to another.

Another object of the invention is to provide a plow which may be adapted to properly trail behind tractors of different makes and models where the distance between the drive wheels of the tractors varies.

A still further object of the invention is to provide a plow, for attachment to a tractor or the like, which is so constructed that the disc cylinder or other soil working implements are substantially balanced on the two furrow wheels, there being comparatively little weight upon the tractor hitch, insofar as the cylinder or its equivalent is concerned.

Other objects and advantages of the invention will appear in the following detailed description, taken in connection with the accompanying drawings, forming a part of this specification, and in which drawings:

Figure 1 is a plan view of a plow constructed according to the present invention, with the parts arranged for straight ahead travel.

Figure 2 is a side elevation of the same.

Figure 2ª is a view partly in section and partly in elevation showing details of the front furrow wheel control mechanism.

Figure 2$^b$ is a similar view of a portion of the control mechanism for the rear furrow wheel.

Figure 3 is a view similar to Figure 1 but showing the relative position of the parts for a turn to the right.

Figure 4 is a view similar to Figure 1 but showing the relative position of the parts for a turn to the left.

Figure 5 is a fragmentary view in rear elevation of the rear furrow wheel and associated control parts.

Figure 6 is an enlarged sectional view on the line 6—6 of Figure 1.

Figure 7 is a diagrammatic view showing, by way of example, the relationship of the plow to a draft means, such as a tractor.

Figure 8 is a view similar to Figure 1, but showing a modified form of draft frame.

Figure 9 is an enlarged detail sectional view on the line 9—9 of Figure 8.

Figure 10 is a similar view on the line 10—10 of Figure 8.

Figure 11 is a diagrammatic view similar to Figure 7 but showing parts of the draft means adjusted for use with a wide tread tractor.

In the drawings, where similar characters designate similar or like parts thruout the views, A designates a disc cylinder; B an elongate main frame; C a draft frame connected forwardly thereto; D and E, front and rear furrow wheels, respectively; F and G, mountings for the wheels D and E, respectively; H means for adjusting the relative position of the forward portion of frame B toward and from the axis of wheel D; J means for adjusting the relative position of the rear portion of frame B toward and from the axis of wheel E; K means for simultaneously operating the wheels D and E to properly trail with respect to the draft means and to guide them in proper paths when backing; L a prop which may be provided to facilitate connecting the plow to a draft means, such as tractor M; and N, referring more particularly to Figures 8–11, a modified form of draft frame.

The frame B, in the example shown, supports a disc cylinder A comprising a plurality of concavo-convex discs 12, having a common axis of rotation. These discs may be mounted on a shaft 13 and held in spaced relation, by spacers 14, the shaft 13 received by bearings 15 and 16, carried by frame B. It is preferred to arrange the discs so that they rotate in unison and while, in the example shown, discs are shown as soil working implements it is to be understood that this is merely by way of example, since certain features of the invention are applicable to plows generally.

The frame B comprises a main body part or beam 17, and rearwardly extending arms 18 and 19. The arm 18 may be of L-shape, detachably secured to the beam 17 as by bolts 20, extending thru an arm portion 21 which parallels the beam. By this construction the arm 18 may be bolted at various positions along the beam 17 to accommodate disc cylinders of different lengths. It is preferred to secure the arm 18 intermediate the ends of beam 17 so that there is a beam extension 22 for a purpose to be subsequently set forth. The arm 19 is preferably integral with beam 17. The arms 18 and 19 extend rearwardly with respect to beam 17, and in the example shown, carry at their rearward ends, the bearings 15 and 16 of the disc cylinder A.

Referring now to the draft frame C as shown in Figures 1–7, it comprises draft frame bars 25 and 26, king pin block 27, a cross bar 28 and a tongue 29. A brace 30 between main frame beam 17 and draft frame bar 25, may be provided, this brace also acting to support the prop L. The bar 26 is shorter than bar 25 and these bars are arranged in forwardly converging relation. At their rear ends they are secured to the beam 17, as by bolts 20 and 31, and at their forward ends may be connected to the king pin block 27 as by bolts 32. The cross bar 28 is secured to the bars 26 and 27 intermediate their ends and assists in supporting the draft bar or tongue 29 as may be observed from Figure 6. The tongue 29 preferably comprises an upper bar 35, a lower bar 36, a spacing block 37 secured between the bars 35 and 36 as by bolts 38, and a cylindrical spacer 39 secured between bars 35 and 36 as by bolt 40. The king pin block 27 is also disposed between the bars 35 and 36, intermediate their ends so that a king pin 41 acts as a pivot for the tongue. If desired, a bushing 41' may be provided about king pin 41, in block 27. It will be noted in Figure 6 that the bars 35 and 36 embrace the cross bar 28, so that if the frame or tongue should become distorted, the cross bar 28 will assist in relieving the king pin block of strain. At the forward end of tongue 29 a coupling pin 42 is provided, for connection with the coupling block 43 of the tractor M as shown in Figure 7.

The front and rear furrow wheels may be the product of the same mould, and in the example shown each comprises a main body part 45 providing a relatively wide circumferential tread 46, an outstanding circumferential flange 47 to one side of tread 46, and a hub 48. The main body part of the wheel preferably tapers, so that the tread 46 is of greatest diameter next adjacent to the flange 47.

The mounting F for the wheel D may comprise an angle bracket 50 including arms 51 and 52 and a sleeve 53, preferably at the juncture of the arms 51 and 52; and an upright shaft 54, movable vertically in sleeve 53 and provided at its lower end portion with a laterally extending stub axle 55, with its axis at an obtuse angle to the axis of the shaft. The stub axle 55 receives the hub 48 of the furrow wheel D. This bracket 50 is secured to extension 22.

The mounting G for wheel E is somewhat similar in that it comprises a bracket 56 including a main body part 57 secured to the frame arm 19 as by bolts 58, a head 59, an arm 60, and a sleeve 61, preferably at the juncture between head 59 and arm 60; and an upright shaft 62, movable in sleeve 61 and provided at its lower end portion with a laterally extending stub axle 63, with its axis at an obtuse angle to the axis of shaft 62. This stub axle 63 receives the hub 48 of the rear furrow wheel E.

In the example shown, the means H for adjusting the relative position of the forward portion of frame B toward and from the axis of wheel D comprises a bell crank lever 65 pivoted as at 66 to a bracket 67 carried by arm 52, the bell crank lever including arm 68 and 69; means 70 for retaining the bell crank lever in the desired adjusted position; a link 71 operatively connected as at 72, to the arm 69 of lever 65, and operatively connected at its upper end portion, as by means 72, to the upper end portion of shaft 54; and a spring 73 to assist in the operation of lever 65 and associated parts. The arm 68 of lever 65 extends forwardly and has its hand grip portion 75 above and closely adjacent the tongue 29, so that the drive of the tractor may reach rearwardly for manipulation of the lever. The means 70 preferably comprises a quadrant 76 carried by bracket 67 and a pawl device 77 of any approved conventional type, including a hand grip portion 78 at handle 75. The means 72 preferably comprises an arm 79 carried by and secured to the upper end portion of shaft 54, and extending laterally therefrom, and an angle bracket 80, having its one leg pivoted to arm 79 as at 81 and its other leg pivoted as at 82, to the link 71. The spring 73 may have its one end portion connected to an ear 85 carried by quadrant 76, and its other end portion secured to a clip 86 carried by the free end portion of arm 69 of lever 65. The action of this tension spring 73 is to tend to draw the free end portion of arm 69 toward ear 85 which, being rigid with the frame B, tends to lift the frame relative to the furrow wheel.

As may be observed from an inspection of Figures 1, 2 and 2ª, if the free end portion of lever arm 68 is swung upwardly as by first releasing the pawl mechanism 77, the end portion of frame B adjacent the furrow wheel D is lifted, the sleeve 53 sliding longitudinally of the upright shaft 54. By means 72, this is accomplished even tho the shaft 54 may have been turned for travel to the right, as shown in Figure 3, or for travel to the left as shown in Figure 4, since the angle bracket 80 permits of this pivotal movement still holding the link 71 in proper relation to lever arm 69 and the upper end portion of shaft 54.

The means J for adjusting the relative position of the rear portion of frame B toward and from the axis of wheel E is similar to means H. It comprises a bell crank lever 90, pivotally carried as at 91 by a bracket 92 carried by arm 60 of bracket 56, the bell crank lever including arms 93 and 94; a link 95, operatively connected as at 96 to arm 94 and at its upper end portion, by means 97 to the upper end portion of shaft 62; a spring 98 to facilitate operation of the adjusting means; and motion transmitting means 99 operatively connected to lever 90 so that it may be moved and held in adjusted position by the operator of the tractor. The means 97 may be the same as that designated 72, and the tension spring 98 may have its one end portion connected to an ear 100 carried by bracket 92, with its other end portion connected to a clip 101 on the free end portion of lever arm 94. The motion transmitting means 99 may comprise a hand lever 105, the hand grip portion 106 of which is above and closely adjacent the forward end of tongue or draft bar 29, the lever 105 being pivoted to a bracket 107 as at 108; means 109 to retain the lever 105 in adjusted positions; and a link or reach bar 110 having its forward end portion pivotally connected as at 111 to the lever 105, intermediate its ends, and its rear end portion pivotally connected as at 112, to the free end of arm 93 of lever 90. The means 109 may comprise a quadrant 113 having a series of teeth 114 extending thruout the greater portion of its length, and a tooth 115 adjacent its rear end portion, and any approved conventional pawl mechanism 116, associated with the quadrant and including a hand grasp portion 117 adjacent the handle 106. When the lever 105 is swung rearwardly, it lifts the rear portion of frame A relative to the furrow wheel E. For most plowing operations, the series of teeth 114 of quadrant 113 serve to obtain nice adjustment, while the tooth 115 may be used to retain the lever 105 in the desired adjusted position, with the frame lifted a considerable distance, as for travel to and from the field, where it is desired to keep the disc cylinder out of contact with the ground.

The means K includes the tongue or draft bar 29 and broadly includes motion transmitting means 120 between the rear end portion of draft bar 29 and shaft 54, and motion transmitting means 121 between the rear end portion of said draft bar 29 and shaft 62. These motion transmitting means are preferably made so that when the plow is being drawn straight ahead, the furrow wheels D and E are preferably in parallel planes, however, if the draft bar or tongue is moved to either the right or the left movement is imparted to the shafts 54 and 62, to move the wheels in opposite directions from a position from straight ahead travel, as may be observed from an inspection of Figures 3 and 4. This permits the plow to trail properly behind a tractor, for a short turn at the ends of fields, without lateral skidding, and also to cause the plow to move in the proper guided direction when being backed into a shed, or at the ends of fields to facilitate thorough plowing close to fences.

The motion transmitting means 120 preferably comprises a laterally extending arm 125, secured to shaft 54, and extending inwardly toward the path of travel as shown in Figures 1–4; a relatively short arm 126 carried by draw bar 29 adjacent but spaced from king pin 41, this arm also extending in the same direction as arm 125; and adjustable reach rod 127 connecting the arm 126 to lever 125. The adjustable reach rod may comprise sections 130 and 131 connected in juxtaposed relation by clamps 132. If the draw bar 29 is swung for travel to the right, the lever 125 is pulled forwardly thru the reach bar 127, and if swung for travel to the left, the lever 125 is pushed rearwardly with corresponding movements imparted to the front furrow wheel.

The motion transmitting means 121 preferably comprises a lever 135 extending laterally from and secured to shaft 62, this lever, as shown in Figure 1 extending away from the axis of travel of the plow; an arm 136 carried by the rear portion of draw bar 29, this arm preferably being of greater length than arm 126 and disposed at a greater distance from the king pin 41; and an adjustable reach bar 137, preferably comprising sections 138 and 139 adjustably connected together by clamps 140. By this construction it will be observed that if the draw bar is swung for travel to the right, the lever 135 is pushed rearwardly thru the reach rod 137, and if swung for travel to the left, the lever 135 is pulled forwardly.

The arms 126 and 136 may form a part of a Z-shaped bar, the central portion of which is secured to the draw bar or tongue by means of bolt 40, and additional bolt 145 being provided to assist in holding it rigid to the draw bar. These arms 126 and 136 dispose their respective reach rods sufficiently remote from one another as to cause no interference during movement and also operatively connect their respective reach rods with the draw bar in a manner that the shaft 62 is turned to a greater degree than shaft 54 during the swinging movement of the draw bar or tongue.

Referring now to the draft frame N shown more particularly by Figures 8–11 it preferably comprises draft frame bars 150 and 151 disposed in forwardly converging relation from the beam 17 of frame B, the bar 150 being relatively shorter than bar 151, so that the elongate frame B is disposed with its longitudinal axis diagonally crosswise the path of travel of the plow; an elongate king pin block 152, having a plurality of holes 153 in spaced apart relation longitudinally of the block, the block carried crosswise of the forward end portions of the draft frame bars 150 and 151; a cross bar 154 extending between the bars 150 and 151, and connected thereto, as by bolts 155; and a draft bar or tongue 156 pivotally connected to block 152 as by king pin 157. A brace 158 may also be provided extending between the beam 17 and bar 151, affording a support for the prop L. The draft bar or tongue 156 may be of a construction substantially the same as that designated 29 but it is to be observed that the king pin 157 may extend thru any one of the holes 153 and whereby the line of draft may be changed to meet various conditions encountered, such as adjustment for use to the particular make or model of tractor available, and to meet the requirements of soil condition, hilly land, etc. In Figure 8 the draft bar or tongue 156 is shown in a position for a narrow gauge tractor, while in Figure 11 the parts are diagrammatically shown in an adjusted position for a wide gauge tractor. It is to be understood that in the movement of the draft bar or tongue 156 relative to the block 152, it is necessary to make corresponding adjustments in the reach rods 127 and 137.

The plows may best be drawn by tractors, and it is desirable to arrange the hitch so that the furrow wheel D of the plow will trail in the furrow in which the rear right tractor wheel travels as shown in Figures 7 and 11. It will be observed from the plan views that the disc cylinder is in balanced relation to the furrow wheels, and that the disc cylinder, furrow wheels, and tongue constitute the sole support of the frame when in use in the field, there being no land side wheel. This avoids the necessity of additional adjusting means, avoids the additional weight incident to a land side wheel and permits more accurate trailing of the plow with respect to the tractor, as well as the difficulties experienced when backing. It is further to be noted that the adjustable connections between the frame and the front and rear furrow wheels are independent of one another so that the desired adjustment may be accomplished, to regulate the degree of penetration of the disc cylinder into the soil. Furthermore, this adjustment may be accomplished by the operator of the tractor since the handles 75 and 106 of the control levers are above and adjacent the forward end of the draft bar or tongue.

If it is desired that, when traveling straight ahead, the furrow wheels D and E be not in parallel planes but that one be slightly in angular relation to the path of travel, adjustment may be had thru the selected adjustable reach rod.

When starting to plow the average soil, the front furrow wheel is elevated so that its bottom is above an imaginery line touching the bottom edges of the plow discs, a distance about equal to the depth it is desired that the plows penetrate. The rear furrow wheel may be likewise adjusted, and as soon as the plows have penetrated to the extent desired, the furrow wheels are adjusted so they travel in the furrows and hold or support the disc cylinder for the proper depth of plowing. For instance, in hard soil the bottoms of the furrow wheels are adjusted slightly above such imaginery line referred to, whereas in soft soil the wheels may be placed so that their bottoms are below such line.

In practice the plows have been found superior to those having land side wheels since accurate backing of the plow may be accomplished. Satisfactory operation of the plow in fields having humps or ridges is also evidenced by lack of land side wheels for they have a tendency to cause the frame to rise up and down or vibrate whenever a hump or hill is encountered.

Changes in details may be made without departing from the spirit and scope of the following claims:

We claim:

1. A plow comprising, a frame, a disc cylinder carrier by said frame, a pair of furrow wheels, and a tongue connected to the frame for drawing same, said disc cylinder and furrow wheels constituting the sole support of the frame when in use in the field.

2. A plow comprising, a frame, a disc cylinder carried by said frame, a pair of furrow wheels, individual mountings for said furrow wheels located at opposite end portions of said frame, said wheels being adjustable vertically to regulate the degree of penetration of the disc cylinder into the soil, and adjustable horizontally for steering purposes, a tongue pivotally connected to the frame for drawing same, with the longitudinal axis of the frame diagonally crosswise the path of travel of the plow, and means operatively connecting said wheels and tongue for steering the former by lateral movement of the latter.

3. A plow comprising, an elongate frame, a pair of furrow wheels, individual mountings for said wheels located at opposite end portions of said frame, each mounting including an upright shaft carrying the wheel and a laterally extending arm, a tongue pivotally connected intermediate its ends to the frame to draw the same, with its longitudinal axis crosswise the path of travel of the plow, so that one furrow wheel is forward and the other rearward of the frame, and the axis of the tongue is intermediate said furrow wheels, reach rods connected to the said arms of said shafts and extending forwardly therefrom, an arm carried by and extending laterally from the tongue at its side away from said forward furrow wheel and to which arm said reach rod of the forward furrow wheel is connected, and an arm carried by and extending laterally from the tongue at its side away from said rearward furrow wheel and to which arm the other reach rod is connected.

4. A plow comprising, an elongated frame, a pair of furrow wheels, individual mountings for said wheels located at opposite end portions of said frame, each mounting including an upright shaft carrying the wheel and a laterally extending arm, a tongue pivotally connected intermediate its ends to the frame to draw the same, with its longitudinal axis crosswise the path of travel of the plow, so that one furrow wheel is forward and the other rearward of the frame, and the axis of the tongue is intermediate said furrow wheels, reach rods connected to the said arms of said shafts and extending forwardly therefrom, an arm carried by and extending laterally from the tongue at its side away from said forward furrow wheel and to which arm said reach rod of the forward furrow wheel is connected, and an arm carried by and extending laterally from the tongue at its side away from said rearward furrow wheel and to which arm the other reach rod is connected, the first mentioned arm carried by said tongue being shorter than the last mentioned arm, whereby the shaft of the rearward furrow wheel mounting is turned to a greater degree than the other shaft upon lateral swinging movement of the tongue.

5. A plow comprising, an elongate plow frame, wheels supporting said frame and positioned to dispose the frame with its longitudinal axis diagonally crosswise the path of travel of the plow, a pair of draft frame bars secured to said plow frame and disposed in forwardly converging relation from the frame, a cross bar secured to and between said draft frame bars intermediate their ends, and a tongue pivotally carried by said draft frame bars adjacent their forward ends, said tongue having portions extending above and below said cross bar.

6. A plow comprising, an elongate plow frame, wheels supporting said frame, and positioned to dispose the frame with its longitudinal axis diagonally crosswise the path of travel of the plow, a pair of draft frame bars secured to said plow frame and disposed in forwardly converging relation from the frame, a cross bar secured to and between said draft frame bars intermediate their ends, a king pin block carried by the forward end portions of said draft frame bars, a tongue including spaced strips extending above and below said block and cross bar, and a king pin carried by said tongue strips and thru said block.

7. A plow comprising, an elongate plow frame, wheels supporting said frame and positioned to dispose the frame with its longitudinal axis diagonally crosswise the path of travel of the plow, a pair of draft frame bars secured to said plow frame and disposed in forwardly converging relation from the frame, a cross bar secured to and between said draft frame bars intermediate their ends, an elongate king pin block having a plurality of holes spaced longitudinally of the block, said block carried crosswise of the forward end portions of said draft frame bars, a tongue including spaced strips extending above and below said block and cross bar, and a king pin detachably carried by said tongue and extending thru any one of the holes in said block.

8. A plow comprising, a frame, a pair of furrow wheels supporting said frame, a disc cylinder carried by the frame in balanced relation to said furrow wheels, and a tongue connected to the frame for drawing same.

ELBERT L. WILLSON.
JOSEPH H. TAYLOR.